United States Patent
Suzuki (12) 
(10) Patent No.: US 6,230,187 B1
(45) Date of Patent: May 8, 2001

(54) DATA TRANSMISSION/RECEPTION APPARATUS AND COMPUTER PROGRAM PRODUCT

(75) Inventor: Hideo Suzuki, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/184,834

(22) Filed: Nov. 2, 1998

(30) Foreign Application Priority Data

Nov. 6, 1997 (JP) .................................................. 9-304116

(51) Int. Cl.⁷ .................................................. G06F 15/16
(52) U.S. Cl. .............................. 709/206; 709/201; 379/88
(58) Field of Search .................. 709/206, 201, 709/224, 221, 203; 364/514; 379/88, 201

(56) References Cited

U.S. PATENT DOCUMENTS

| | | |
|---|---|---|
| 5,296,884 | 3/1994 | Yasuhiro et al. . |
| 5,404,231 * | 4/1995 | Blomfield ............................ 358/400 |
| 5,479,411 * | 12/1995 | Klein ................................ 370/110.1 |
| 5,675,507 * | 10/1997 | Bobo, II ............................... 364/514 |
| 5,941,946 * | 8/1999 | Baldwin et al. ...................... 709/206 |
| 5,951,638 * | 9/1999 | Hoss et al. ............................ 709/206 |

FOREIGN PATENT DOCUMENTS

| | | |
|---|---|---|
| 0 449 622 | 10/1991 | (EP) . |
| 0 650 125 | 4/1995 | (EP) . |
| 0 751 672 | 1/1997 | (EP) . |
| 97 07468 | 2/1997 | (WO) . |

OTHER PUBLICATIONS

Patent Abstracts of Japan, vol. 1996, No. 08, Aug. 30, 1996 & JP 08 097927 A (Blue Line Shiya:KK), Apr. 12, 1996.
Patent Abstracts of Japan, vol. 1997, No. 04, Apr. 30, 1997 & JP 08 331272 A (Meidensha Corp), Dec. 13, 1996.
Patent Abstracts of Japan, vol. 1997, No. 10, Oct. 31, 1997 & JP 09 163203 A (Olympus Optical Co Ltd), Jun. 20, 1997.

* cited by examiner

Primary Examiner—Ayaz Sheikh
Assistant Examiner—Khanh Quang Dinh
(74) Attorney, Agent, or Firm—Frishauf, Holtz, Goodman, Langer & Chick, P.C.

(57) ABSTRACT

When the communication control section of a provider (server) receives data from a mobile terminal through a PHS base station and a communication line, the CPU of the provider (server) determines the sender of the received data. The CPU classifies the received data by sender and stores the classified data in a storage unit. The destinations to which the stored data can be sent are also stored as pre-registered transmission destinations in the storage unit. Upon reception of a data transmission request from the mobile terminal or a PC, the CPU determines whether the requester which has sent the data transmission request is a pre-registered transmission destination. When the requester is a pre-registered transmission destination, the CPU causes the communication control section send the data stored in the storage unit to the requester.

4 Claims, 7 Drawing Sheets

DATA TRANSMISSION/RECEPTION APPARATUS AND COMPUTER PROGRAM PRODUCT

BACKGROUND OF THE INVENTION

1. Field of the Invention

The present invention relates to a data transmission/reception apparatus which performs data transmission/reception and a computer program product which includes a storage medium and programs stored therein for working a computer as such a data transmission/reception apparatus.

2. Description of the Related Art

Of late, mobile terminals have become utilized as small-sized, portable information equipment having a user schedule management function, a text editor function, etc. Such mobile terminals are capable of storing various data created by users.

Some mobile terminals can be connected to PHS (Personal Handy Phone System) telephones or can function as PHS telephones themselves, while some mobile terminals can be connected to digital cameras or can function as digital cameras themselves.

Generally speaking, a mobile terminal of the above-described type has a poor data storage capacity and is therefore not capable of storing a large amount of data. Due to this, its user has to expend great care to the remaining storage capacity when storing downloaded information or image data photographed by a digital camera. When the remaining storage capacity is not sufficient to store such information or image data, the user has to delete any other data. In the case where data stored in the mobile terminal cannot be deleted because the user intends to reuse the data later, he/she cannot store new data in the mobile terminal.

SUMMARY OF THE INVENTION

It is accordingly an object of the present invention to permit the user of equipment such as a mobile terminal or the like which has only a limited storage capacity to create data without having to expend great care to the remaining storage capacity.

According to one aspect of the present invention, there is provided a data transmission/reception apparatus which receives data transmitted from senders via a network and stores the received data, the apparatus comprising:

transmission/reception means for transmitting and receiving data through the network;

sender discriminating means for discriminating a sender when the transmission/reception means receives data or when the transmission/reception means receives a data transmission request;

data storage means for, when the transmission/reception means receives data, classifying the received data by sender in accordance with the result of the discrimination performed by the sender discriminating means, and storing the classified data;

destination registering means for storing, as pre-registered transmission destinations associated with the senders, destinations to which the data stored in the data storage means can be sent;

requester determining means for, when the transmission/reception means receives a data transmission request, determining whether a requester which has sent the data transmission request is a pre-registered transmission destination, with reference to the transmission destination registering means in accordance with the result of the discrimination performed by the sender discriminating means; and transmission control means for causing the data transmission/reception means to send data, received from one of the senders which is associated with the requester and stored in the data storage means, to the requester when the requester determining means determines that the requester is a pre-registered destination.

According to the present invention, the user of equipment such as a mobile terminal or the like which has only a limited data storage capacity can utilize the data transmission/reception apparatus as a place for temporarily preserving data. This permits the user to perform the creation of data, etc. without having to expend great care to the remaining storage capacity of the equipment. When the user downloads the data later, moreover, he/she can understand where the data has been created, because the data transmission/reception apparatus automatically affixes a sender's location name (site, address, facility name, etc.) to the data. Furthermore, since the user of the equipment such as a mobile terminal or the like which has only a limited storage capacity can utilize a predetermined apparatus as a place for temporarily preserving data, he/she can perform photographing, etc. without having to expend great care to the remaining storage capacity of the equipment. In addition, it is also unnecessary for the user to designate the transmission destination of photographed image data each time he/she sends it. Therefore, the user can send the data with an easy operation.

DETAILED DESCRIPTION OF THE PREFERRED EMBODIMENTS

Embodiments of the present invention will now be described with reference to FIGS. 1A to 6.

First Embodiment

Figure 1A:
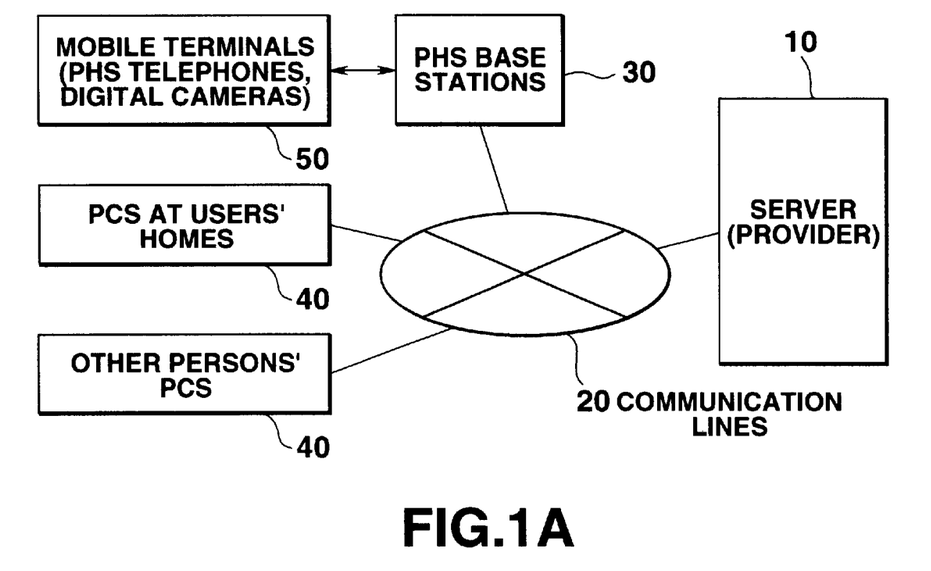
FIG. 1A is a block diagram showing the structure of a communication network system which employs the data transmission/reception apparatus according to the first embodiment of the present invention.

FIG. 1A is a block diagram showing the structure of the communication network system which employs the data transmission/reception apparatus according to the first embodiment of the present invention. The data transmission/reception apparatus of the first embodiment is structured as the server of what is called a provider 10 connected to the Internet.

The provider (server) 10 is connected to PHS base stations 30 and personal computers (PCs) 40 via communication lines 20. Data communications between each of mobile terminals 50, having a PHS telephone function and a digital camera function, and its corresponding communication line 20 are mediated by one of the PHS base stations 30. The PHS base stations 30 affix their own addresses to data received from the mobile terminals 50, for example.

Figure 1B:
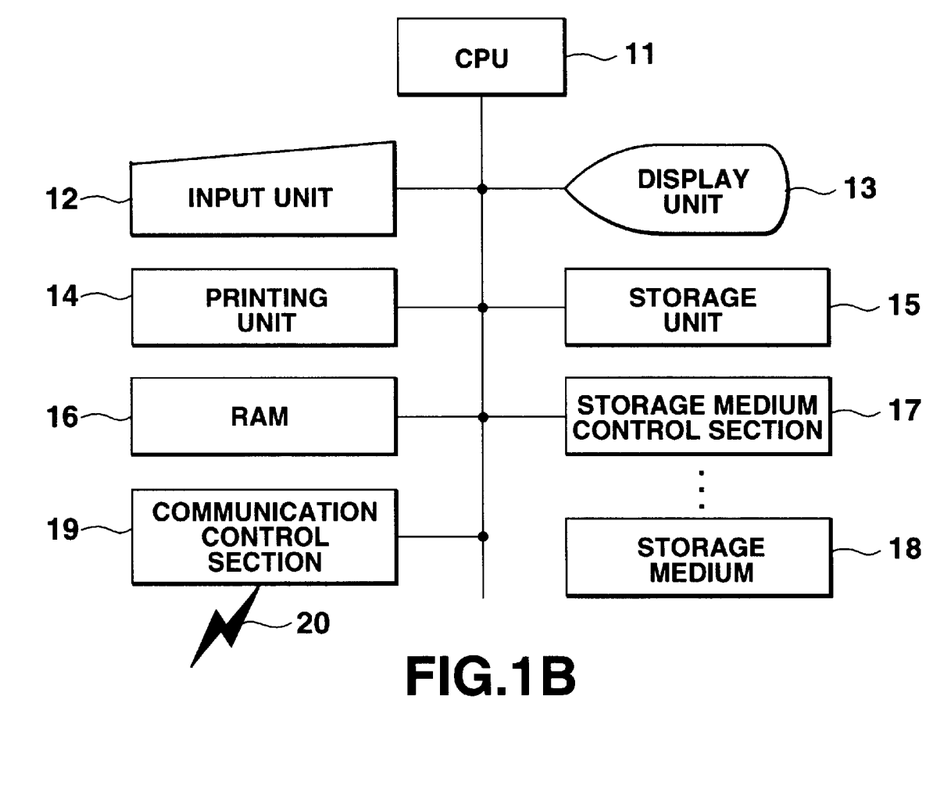
FIG. 1B is a block diagram illustrating a server (provider) which is the data transmission/reception apparatus according to the first embodiment of the present invention.

FIG. 1B is a diagram showing the structure of the provider (server) 10. In the illustration, reference numeral 11 denotes a CPU serving as a control section which controls the entirety of the server. Reference numeral 12 represents an input unit which includes a keyboard, a mouse, etc., while reference numeral 13 denotes a display unit such as a CRT. Reference numeral 14 denotes a printing unit such as a printer, reference numeral 15 represents a storage unit such as a hard disk, a ROM, etc., and reference numeral 16 represents a RAM.

Reference numeral 17 denotes a storage medium control section which controls the storing and reading of data in and from a storage medium 18 such as a loaded floppy disk, a loaded optical (magnetic) disk, etc. Reference numeral 19 denotes a communication control section which transmits and receives data to and from an external apparatus.

A processing program, data, etc. for working the server as the data transmission/reception apparatus are pre-stored in the storage unit 15 or the storage medium 18, and are executed by the CPU 11. Needless to say, the above program, data, etc., pre-stored in the storage unit 15 or the storage medium 18, may otherwise be received from any other apparatus connected to the server via the corresponding communication line 20 or the like and may be stored (in a non-illustrated memory provided in the RAM 16, for example). Alternatively, any other apparatus connected to the server via the corresponding communication line 20 or the like may include a storage unit and a storage medium, and a program, data, etc. stored therein may be used by the server via the corresponding communication line 20.

Figure 1C:
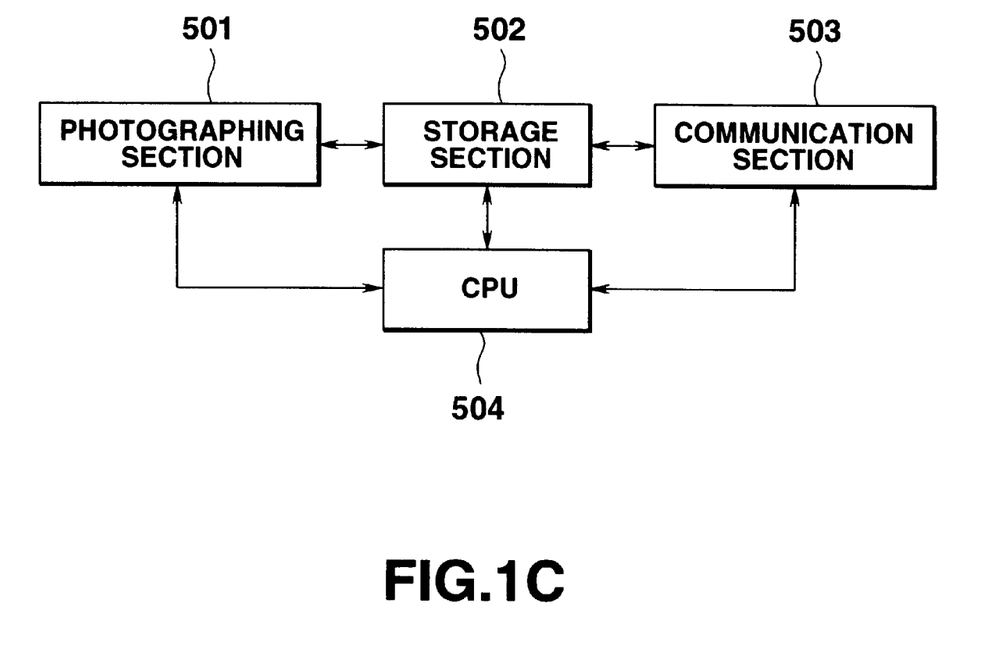
FIG. 1C is a block diagram illustrating a mobile terminal according to the first embodiment of the present invention.

FIG. 1C is a diagram showing the structure of each mobile terminal 50. Each mobile terminal 50 has a photographing section 501 which photographs an image, a storage section 502, a communication section 503 and a CPU 504. The CPU 504 subjects the image photographed by the photographing section 501 to a predetermined conversion process so as to generate image data, and stores the image data in the storage section 502. Furthermore, the CPU 504 causes the communication section 503 to send the image data stored in the storage section 502 to the provider 10 at a predetermined timing.

Figure 2A:
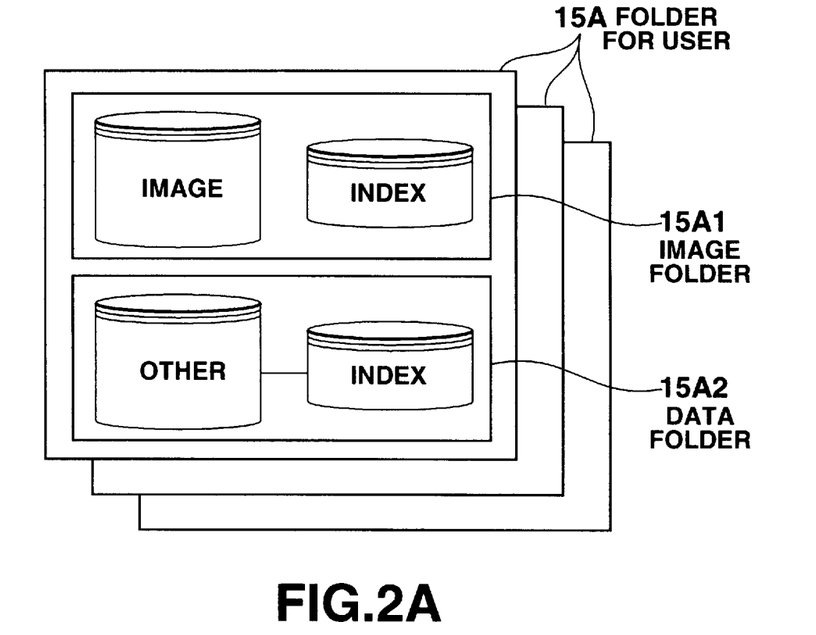
FIGS. 2A to 2C are diagrams illustrating folders for senders, a registration table and a place name table.

According to this embodiment, folders 15A are provided for the respective users (i.e., senders) as illustrated in FIG. 2A. Each folder 15A contains an image folder 15A1 for storing image data and a data folder 15A2 for storing other data (e.g., audio data, text data, etc.). The image folder 15A1 stores image data and index data in association with each other. The data folder 15A2 stores data other than image data, and index data in association with each other.

Figure 2B:
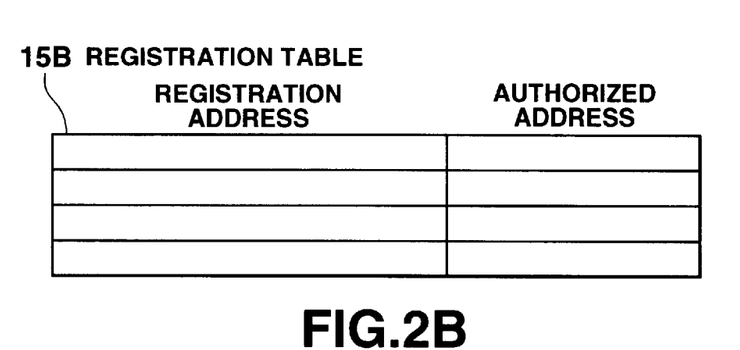
Figure 2C:
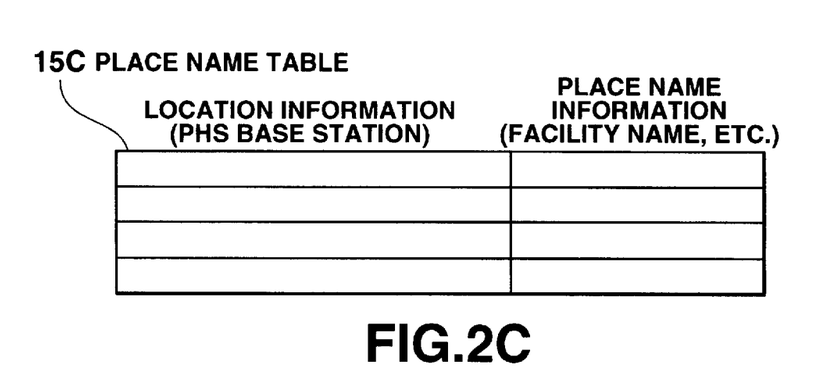

The storage unit 15 stores also a registration table 15B and a place name table 15C, as illustrated in FIGS. 2B and 2C.

The registration table 15B stores registration addresses and authorization addresses in association with each other. The addresses stored in the registration table 15B are those allotted to the PCs 40, the mobile terminals 50 or the users. The addresses specifying the senders of the data items stored in the folders 15A are stored in a registration address area, while the addresses allotted to the PCs 40, the mobile terminals 50 or the users, which are authorized to receive the data items stored in the folders 15A, are stored in an authorization address area.

For example, in order to permit the users of the mobile terminals 50 to send data, which the users have created using the mobile terminals 50, to the PCs 40 at their homes, it is necessary for the users to store the users' addresses or the addresses of their own mobile terminals 50 in the registration address area, and to store the users' addresses or the addresses of their own PCs 40 in the authorization address area. Moreover, in order to allow the users to send the data stored in the folders 15A to the PCs 40 owned by other persons or parties, such as their companies, customers, friends, etc., it is necessary for the users to store the addresses of the PCs 40 owned by the aforementioned other persons or parties in the authorization address area. Storing the addresses in the registration address area and the authorization address area is realized in such a manner that the users designate the addresses to be stored in the registration address area and the authorization address area and send requests for address storage services to the provider 10, and the provider 10, which has received the requests from the users, stores those addresses in the registration address area and the authorization address area of the registration table 15B. Needless to say, a plurality of authorization addresses may be associated with one registration address.

The place name table 15C stores location information and place name information in association with each other. The location information in this case includes the addresses of the PHS base stations 30, while the place name information includes the names of the sites of the PHS base stations 30, their postal addresses and their facility names, etc.

The operation of the provider (server) 10, which forms the data transmission/reception apparatus according to the first embodiment, will now be described.

Figure 3:
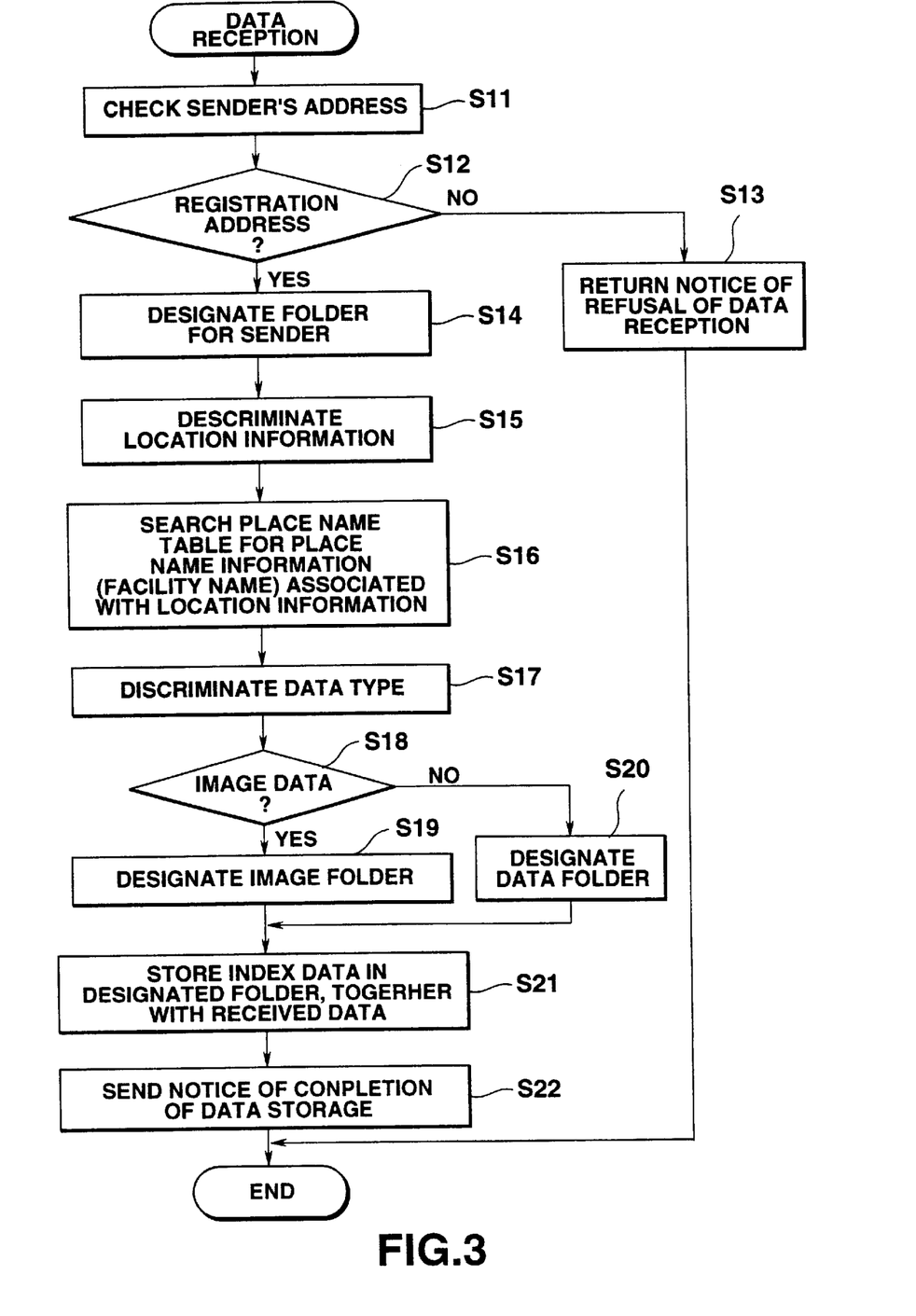
FIG. 3 is a flowchart for explaining the data reception operation of a server which is the data transmission/reception apparatus according to the first embodiment of the present invention.

FIG. 3 is a flowchart for explaining the operation of the provider (server) 10 at the time of data reception. A program for realizing the individual functions described in this flowchart is stored in the storage unit 15 or the storage medium 18 in the form of program code readable by the CPU 11.

First of all, when the communication control section 19 receives data from one mobile terminal 50, the CPU 11 checks the address of the mobile terminal 50 which is the sender of the data (step S11). Then, the CPU 11 determines whether the sender's address has been stored as a registration address in the registration table 15B (step S12). When the CPU 11 determines that the sender's address has not been stored in the registration table 15B, the CPU 11 causes the communication control section 19 to return a notice of refusal of data reception to the sender of the data (step S13), and then terminates the data reception operation.

When the CPU 11 determines that there is the registration address identical with the sender's address in the registration table 15B, the CPU 11 designates the folder provided for the sender, among the folders 15A in the storage unit 15 (step S14). Furthermore, the CPU 11 discriminates the location information (address) concerning the PHS base station 30 which has mediated the data sent from the sender or the mobile terminal 50 (step S15), and searches the place name table 15C for the place name information (the facility name, etc.) associated with the location information (step S16). Thereafter, the CPU 11 discriminates the type of the received data (step S17). When the received data is image data (step S18), the CPU 11 designates the image folder 15A1 contained in the designated folder 15A (step S19), and when the received data is not image data, the CPU 11 designates the data folder 15A2 contained in the designated folder 15A (step S20).

The CPU 11 creates index data specifying data type, a place name (facility name and so on), date and time, etc., and stores the index data and the received data in the folder 15A1 or 15A2 designated by the step S20 (step S21). The CPU 11 then causes the communication control section 19 to send a notice of completion of data storage to the sender or the mobile terminal 50 (step S22), and terminates the data reception operation.

Figure 4:
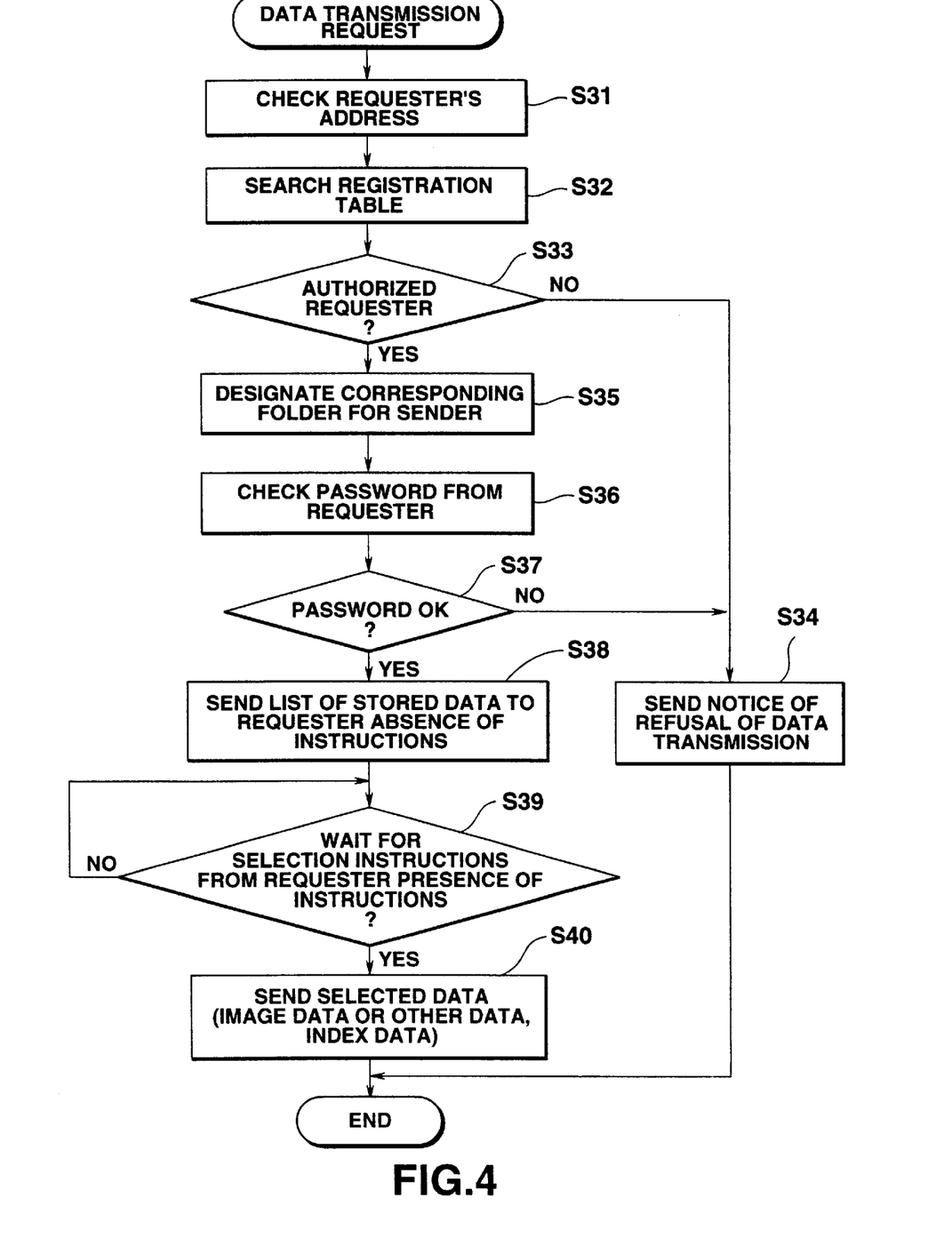
FIG. 4 is a flowchart for explaining the data transmission operation of the server which is the data transmission/reception apparatus according to the first embodiment of the present invention.

FIG. 4 is a flowchart for explaining the data transmission operation of the provider (server) 10 when it receives a data transmission request from an external apparatus, in connection with the data thus stored in the folder 15A1 or 15A2.

First of all, when the communication control section 19 receives a data transmission request from one PC 40 or mobile terminal 50, the CPU checks the requester's address (step S31) and searches the registration table 15B for an authorization address identical with the requester's address (step S32). When there is no address identical with the requester's address in the registration table 15B, in other words, when the requester is not authorized to receive the stored data (step S33), the CPU 11 causes the communication control section 19 to send to the requester a notice that the transmission of the stored data has been refused (step S34), and terminates the data transmission operation.

When there is the authorization address identical with the requester's address in the registration table 15B, the CPU 11 designates one of the folders 15A which stores the data to be transmitted, in accordance with the registration address associated with the authorization address detected in the registration table 15B (step S35). According to the first embodiment, the requested data is not transmitted unconditionally, and a password is checked to enhance security. Hence, the CPU 11 next receives a password from the requester via the communication control section 19 (step S36). When no proper password is supplied from the requester (step S37), the CPU 11 goes to the aforementioned step S34 and causes the communication control section 19 to send a notice of refusal of data transmission to the requester.

When the password is OK, the CPU 11 causes the communication control section 19 to send a list of the data stored in the designated folder 15A to the requester (step S38), and waits for selection instructions from the requester (step S39). When the CPU 11 receives the selection instructions from the requester, the CPU 11 causes the communication control section 19 to send selected data, i.e., image data or other data, and the corresponding index data, to the requester (step S40), and terminates the data transmission operation.

Thus, according to the first embodiment, the user of the information equipment such as the mobile terminal 50 or the like whose data storage capacity is limited can utilize the provider (server) 10 which is the data transmission/reception apparatus as a place for temporarily preserving data. Therefore, the user can perform the creation of image data (photographing), the downloading of data from the Internet and so on, without having to expend great care to the remaining storage capacity of his/her own information equipment. Furthermore, the server automatically affixes to the received data the place name information (site, postal address, facility name, etc.) concerning the PHS base stations 30 which have mediated the data. Therefore, when the user downloads the data later with his own PC 40 or mobile terminal 50, he/she can immediately understand where the data has been created.

Each mobile terminal 50 may be such a type that a PHS telephone and a digital camera are connectable thereto.

Second Embodiment

The second embodiment of the present invention will now be described.

The data transmission/reception apparatus according to the second embodiment is a digital camera having the PHS telephone function. The above-mentioned digital camera, having the PHS telephone function, includes a photographing section 501, a storage section 502, a communication section 503 and a CPU 504, as in the case of the mobile terminals 50 of the first embodiment. However, the digital camera of the second embodiment differs from the mobile terminals 50 of the first embodiment in that the digital camera executes a program for performing the operations which will be described later. This program, which is executed by the digital camera of the second embodiment, may be stored in an internal memory or may be read into the digital camera from an external apparatus. The above-mentioned digital camera having the PHS telephone function serves as, for example, one mobile terminal 50 used in the system illustrated in FIG. 1.

Figures 5A, 5B:
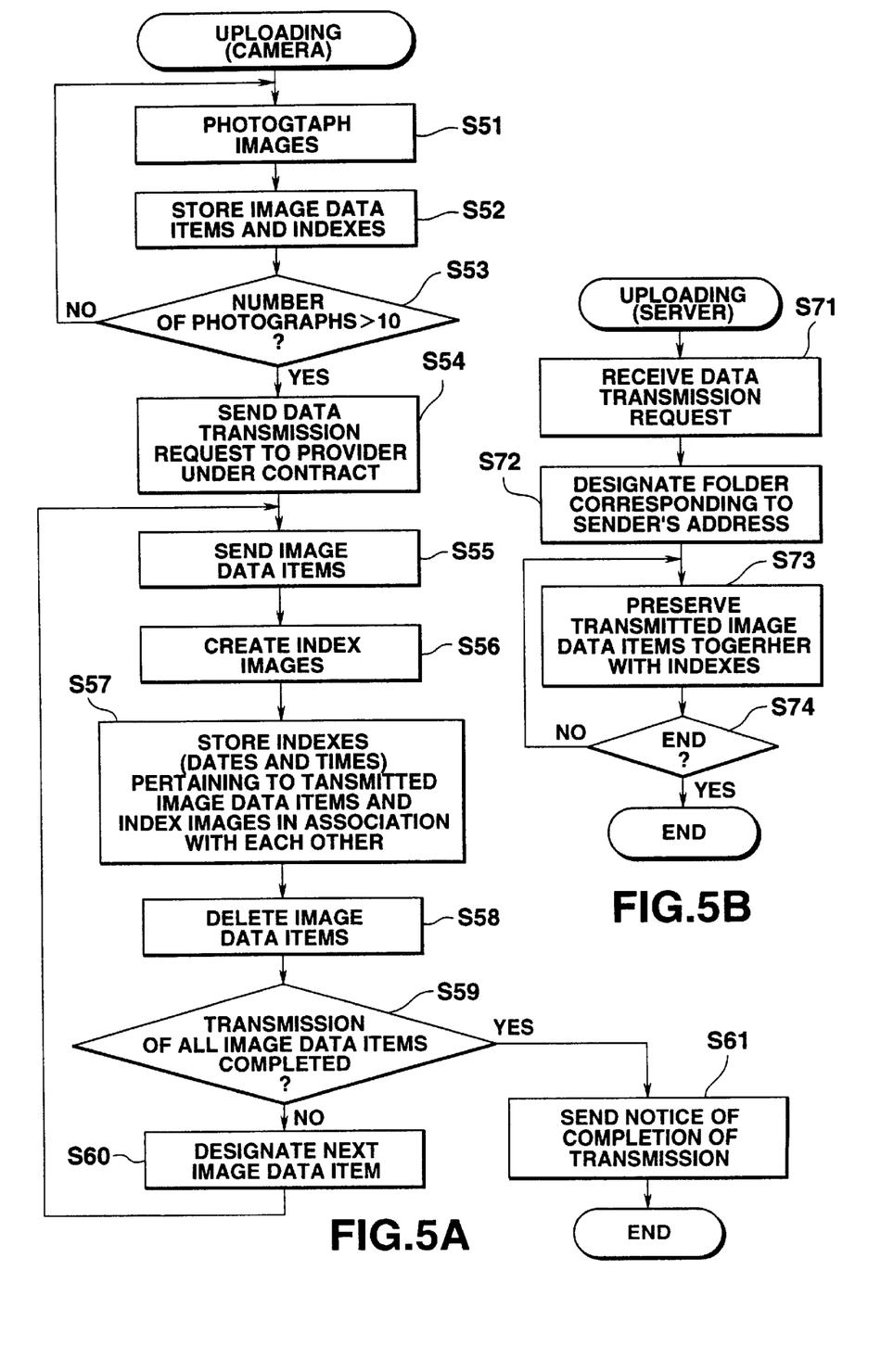
FIG. 5A is a flowchart for explaining the data transmission operation of a mobile terminal which is the data transmission/reception apparatus according to the second embodiment of the present invention.
FIG. 5B is a flowchart for explaining how the server operates in that case.

FIG. 5A is a flowchart for explaining an uploading operation which is executed by the CPU 504 incorporated in the digital camera having the PHS telephone function, while FIG. 5B is a flowchart for explaining the operation of the provider 10 in that case.

To be specific, the CPU 504 of the data transmission/reception apparatus, which is the digital camera having the PHS telephone function, causes the photographing section 501 to perform a known image photographing operation (step S51), and stores photographed image data items in the storage section 502, together with their indexes such as photographing dates and times, etc. (step S52). At that time, the CPU 504 determines whether the number of photographs taken by the digital camera exceeds ten or not (step S53). When the CPU 504 determines that the number of photographs taken does not exceed ten, the CPU 504 returns to the step S51 and allows the digital camera to take more photographs.

When the CPU 504 determines that the number of photographs taken exceeds ten, the CPU 504 sends a data transmission request to the provider 10 with which the user of the digital camera is under contract (step S54).

Thereafter, the CPU 504 causes the communication section 503 to send the image data items (and their indexes) to the provider 10 (step S55), creates index images by reducing the size of the photographs (step S56), and stores in the storage section 502 the index images and the indexes pertaining to the transmitted image data items in association with each other (step S57). Then, the CPU 504 deletes the transmitted image data items (step S58).

At that time, the CPU 504 determines whether the transmission of all image data items stored in the storage section 502 has been completed (step S59). When the CPU 504 determines that the transmission of all image data items has not yet been completed, the CPU 504 designates the next image data item (step S60) and returns to the step S55. When the transmission of all image data items has been completed, the CPU 504 causes the communication section 503 to send a notice of completion of transmission to the provider (step S61), and terminates the uploading operation.

When the server of the provider 10 receives the data transmission request sent by the step S54 (step S71), the server designates that one of the folders 15A which corresponds to the sender's address as explained in the first embodiment (step S72), and preserves the image data items sent by the step S55 in the designated holder 15A, together with the accompanying indexes or the automatically created indexes as explained in the first embodiment (step S73). The server repeats the preservation of received image data until receiving the notice of completion of transmission sent by the step S61 (step S74).

Figure 6:
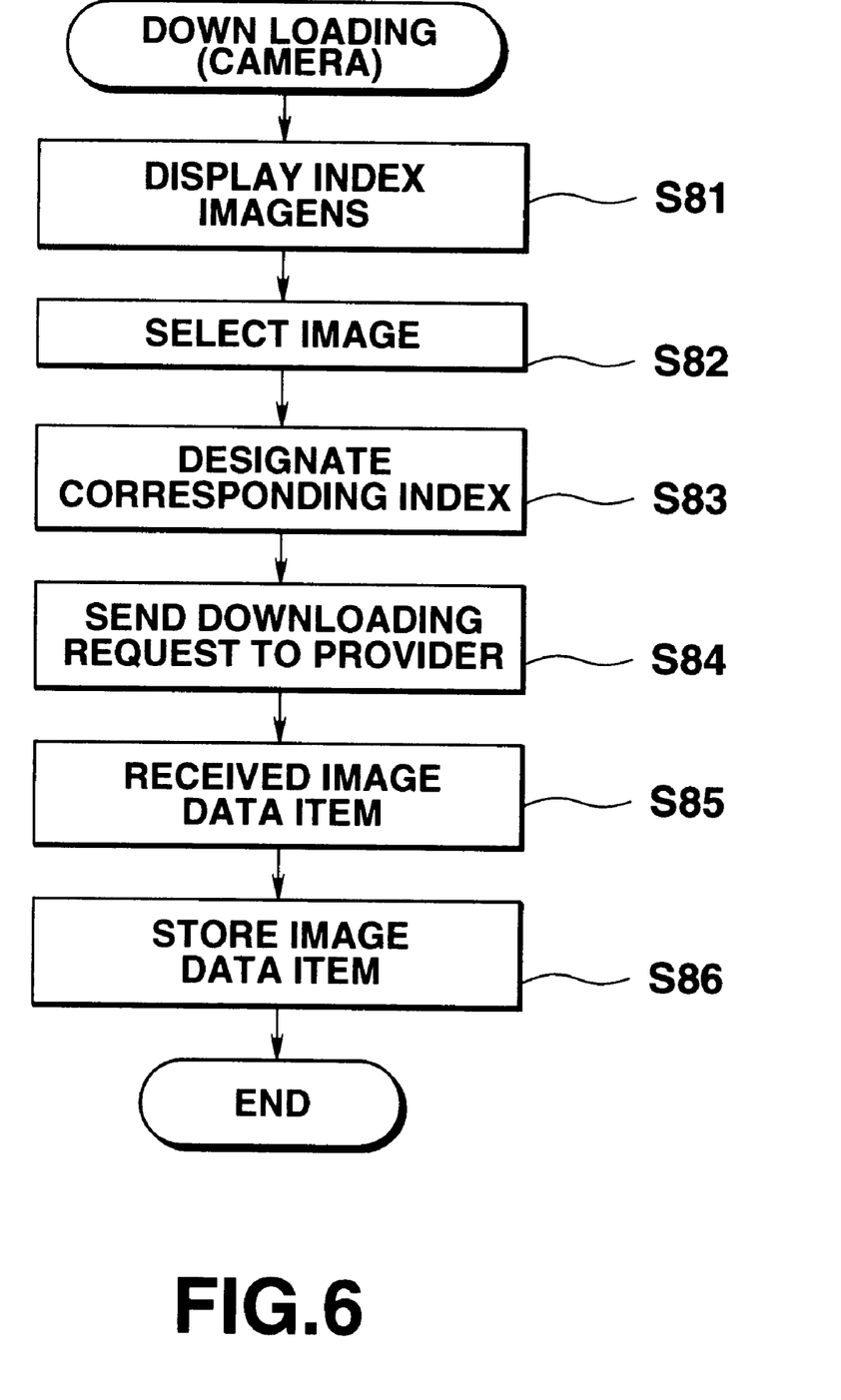
FIG. 6 is a flowchart for explaining the data reception operation of the mobile terminal which is the data transmission/reception apparatus according to the second embodiment of the present invention.

The downloading of the image data stored in the provider (server) 10 in the above-described manner will now be described with reference to FIG. 6.

In the step S57, the CPU 504 of the digital camera having the PHS telephone function reads out the index images stored by the step S57 from the storage section 502, and displays the read-out images on a non-illustrated display section such as an LCD or the like (step S81). When the user performs a predetermined image selecting operation with respect to the index images (step S82), the CPU designates the index corresponding to a selected index image (step S83), and sends a downloading request to the provider 10 (step S84).

The CPU 504 receives the image data item corresponding to the designated index and sent from the provider 10 in response to the downloading request (step S85), stores the received image data item in the storage section 502 (step S86), and terminates the downloading operation.

Thus, according to the second embodiment, the user of information equipment such as a mobile terminal or the like which has a limited data storage capacity can utilize a predetermined apparatus (i.e., the provider) as a place for temporarily preserving data. Therefore, the user can take photographs without having to expend great care to the remaining storage capacity of his/her own information equipment. Presetting a data storage folder to the provider, moreover, makes it unnecessary for the user to designate the transmission destination of the image data each time he/she sends the image data. Thus, the user can send the data with an easy operation.

In the second embodiment, the user performs uploading each time he/she photographs ten images. However, the number of images is not limited thereto. For example, the user may perform uploading as soon as he/she has finished photographing, regardless of the number of images as photographed, or the user may perform uploading while the digital camera is in a predetermined state, such as the state wherein the digital camera is performing no photographing operation or wherein the camera function is switched off.

The above-described digital camera having the PHS telephone function may be such a type that a PHS telephone is connectable thereto.

What is claimed is:

1. A photographed image preservation system adapted to receive and preserve photographed image data sent via a network from a mobile terminal having a digital camera function, and to send the preserved photographed image data to a requester terminal which has sent a data transmission request for the photographed image data, said system comprising:

a registration table which stores in advance terminal identification information identifying the mobile terminal which has sent the photographed image data, and requester information identifying at least one requester terminal authorized to access the photographed image data, in association with each other, discriminating means for, when said photographed image preservation system receives the photographed image data from the mobile terminal, discriminating location information specifying a location from which the photographed image data has been sent by the mobile terminal, and for associating place information specifying a place where the image data was photographed with the photographed image data based on the location information;

storage means for storing the photographed image data and the place information associated therewith in one of a plurality of storage folders based on the terminal identification information identifying the mobile terminal which sent the photographed image data; and means for, when a data transmission request for the photographed image is received from a requester terminal:

searching said registration table for requester information corresponding to the requester terminal;

specifying one of the storage folders based on terminal identification information which is pre-registered in association with the requester information, reading the photographed image data stored in the specified folder together with the place information associated with the photographed image data, and sending the read data to the requester terminal.

2. A mobile terminal adapted to send photographed image data to a photographed image preservation apparatus which is connected to said mobile terminal via a network, said mobile terminal comprising:

photographing means for photographing objects to be photographed;

image data storage means for storing photographed image data of the objects photographed by said photographing means;

sending means for sending the photographed image data to the photographed image preservation apparatus for temporary storage in the photographed image preservation apparatus;

index image storage means for creating index images by reducing a size of the photographed image data, and for storing the index images in place of the photographed image data;

selection means for displaying the index images, and for enabling a desired one of the index images to be arbitrarily selected;

means for sending to the photographed image preservation apparatus a data transmission request to retrieve a photographed image data item corresponding to the selected index image; and means for receiving the retrieved photographed image data item from the photographed image preservation apparatus, and for storing the received photographed image data item.

3. The mobile terminal according to claim 2, further comprising discriminating means for discriminating when a number of data items of the photographed image data stored in said image data storage means reaches a predetermined number, and for causing said sending means to automatically send the photographed image data when the number of data items reaches the predetermined number.

4. A system comprising a mobile terminal having a digital camera function, and a photographed image preservation apparatus which receives and temporarily preserves photographed image data sent from the mobile terminal via a network and which sends back the temporarily-preserved photographed image data to the mobile terminal, wherein:

(i) the mobile terminal includes:

photographing means for photographing objects to be photographed, image data storage means for storing photographed image data of the objects photographed by said photographing means, discriminating means for discriminating when a number of data items of the photographed image data stored in said image data storage means reaches a predetermined number, sending means for, when said discriminating means discriminates that the number of data items reaches the predetermined number, sending the photographed image data to the photographed image preservation apparatus via the network, means for storing index images based on the sent image data in place of the photographed image data, means for selecting a desired index image from among the index images which are stored in place of the photographed image data sent to the photographed image preservation apparatus, and for sending to the photographed image preservation apparatus a data transmission request to retrieve a photographed image data item corresponding to the selected index image, and means for receiving the photographed image data item retrieved by the photographed image preservation apparatus, and for storing the received photographed image data item; and (ii) the photographed image preservation apparatus comprises:

means for receiving the photographed image data from the mobile terminal, specifying a storage folder corresponding to the mobile terminal which sent the photographed image data, and temporarily preserving the photographed image data in the specified storage folder, and means for receiving the data transmission request from the mobile terminal, reading the photographed image data item corresponding to the selected index image from the storage folder corresponding to the mobile terminal which sent the data transmission request, and sending the read image data item back to the mobile terminal which sent the data transmission request.

* * * * *